March 25, 1947. J. W. TETER 2,417,893
PRODUCTION OF NITRILES AND AMINES
Filed Oct. 12, 1944
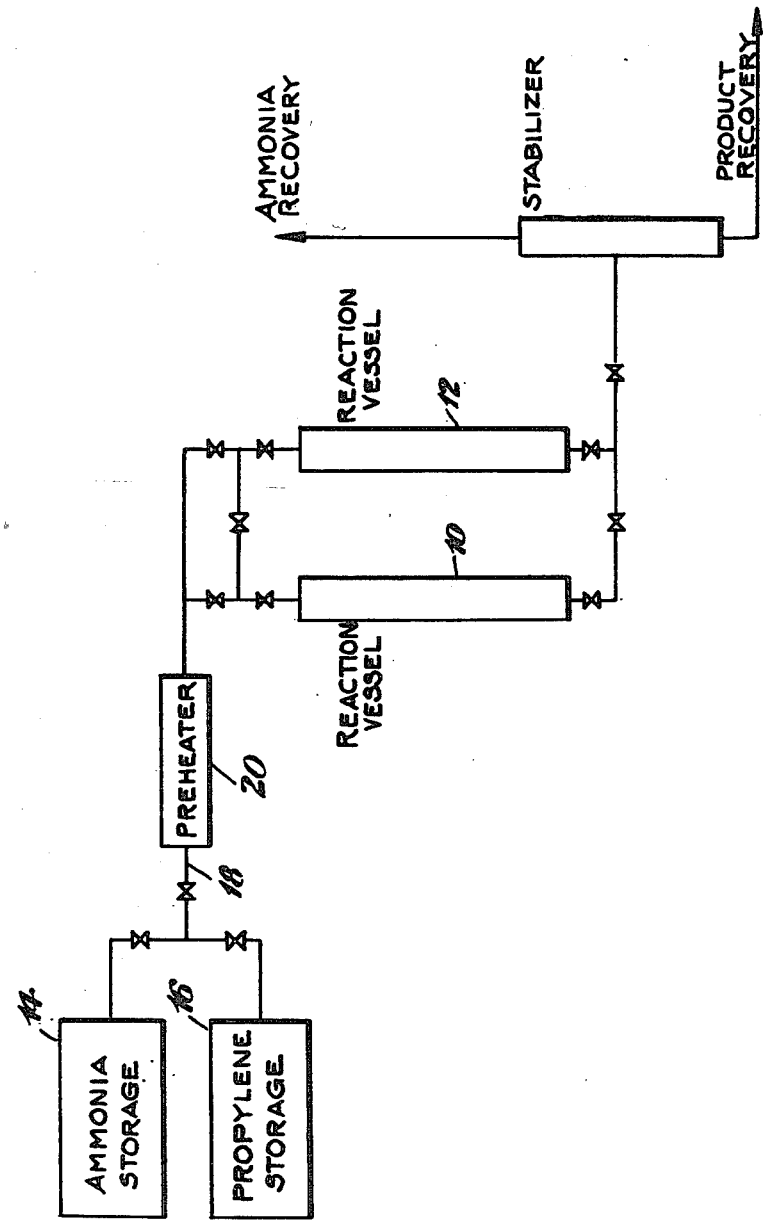
INVENTOR
John W Teter
BY
ATTORNEYS Patented Mar. 25, 1947

2,417,893

UNITED STATES PATENT OFFICE 2,417,893

PRODUCTION OF NITRILES AND AMINES

John W. Teter, Chicago, Ill., assignor to Sinclair Refining Company, New York, N. Y., a corporation of Maine Application October 12, 1944, Serial No. 558,486

4 Claims. (Cl. 260—464)

This invention relates to improvements in the direct, catalytic production of nitrogen-containing products from olefins and ammonia by reaction at elevated temperatures and pressures.

The production of nitrogen-containing products, particularly nitriles and to some extent amines, by reaction of olefins with ammonia at elevated temperatures and pressures is described in applications Serial Nos. 289,186, filed August 9, 1939; 365,561, filed November 13, 1940; 365,563, filed November 13, 1940; and 464,636, filed November 5, 1942. In general, the reaction is carried out by passing a mixture of the ammonia and olefin, which mixture will advantageously contain an excess of ammonia, and may contain inert gases, such as the saturated hydrocarbons corresponding to the selected olefins, over a catalyst at reactive temperatures, for example, from 500 to 800° F., under pressure, for example at a pressure of 500 to 5000 pounds per square inch, in the presence of an amination catalyst. Catalysts which are particularly useful in effecting this conversion are described in applications Serial Nos. 365,563, filed November 13, 1940; and 444,095, 444,096, and 444,097, filed May 22, 1942; and in general consist of reduced metal oxides, such as nickel and cobalt. Particularly effective as a catalyst is the product resulting from the reduction of cobalt oxide obtained by calcining the oxide precipitated from a solution of a cobalt salt on a suitable carrier such as diatomaceous earth, by the use of alkali or carbonated alkali, particularly if activated by manganese.

In such processes, side reactions which result in the deposition of tarry material or carbon on the catalyst, and which result in the production of undesired products, as by cracking the hydrocarbon, take place to some extent. In a single pass through a typical reactor, the conversion obtained to nitrogen-containing products such as nitriles and amines is ordinarily rather low, for example, from 10 to 15 mol % based on the olefin feed.

In application Serial No. 265,564, filed November 13, 1940, is described the direct reaction of ammonia, olefin, and relatively large quantities of water, e. g., 0.25 to several moles of water per mole of olefin, under more or less similar conditions and with the use of similar types of catalysts with production of amides as well as other nitrogen-containing products. The use of water in such quantities substantially influences the character of the reaction in the sense that it brings about the production of amides to a considerable extent instead of nitriles, possibly by hydrolysis of the nitriles formed.

The mechanism of the direct amination reaction is not fully understood. The production of nitriles in the process may result from the initial direct addition of ammonia to the olefin with production of the amine and subsequent dehydrogenation of the amine to the nitrile. To some extent this theory is supported by the fact that in the amination of the propylene, considerable quantities of isopropylamine, which does not dehydrogenate to a nitrile, are found in the reaction product, while substantially no primary amine is found although considerable quantities of acetonitrile, propionitrile and butyronitrile are found, with propionitrile predominating.

The present invention is based upon the discovery that by supplying regulated small quantities of water to the reaction zone along with the ammonia, olefin and, to the extent they are present, other associated gases such as alkanes, the extent of conversion of olefin to nitrogen-containing products is increased, and the period during which the catalyst is active without regeneration or reactivation is substantially increased, as is the total life of the catalyst.

The present invention, therefore, provides an improvement in the direct amination of olefins by the procedure described above which consists in supplying, to the reaction zone, regulated small quantities of water.

The amount of water added may vary, the variations being based upon considerations hereafter discussed, but will be a fraction of 1% of the total feed, i. e., ammonia, olefin and other gases, such as alkanes, and will be such as to provide a partial pressure, in the reactor, of from about 0.1 to about 30 #/sq. in. Optimum results appear to be obtained in the range of about .8 to about 8 #/sq. in. Thus where the feed mixture contains ammonia, olefin and associated gases such as alkanes in the approximate ratio 10:1:1, the amount of added water may be about 0.2 to about 5.0%, based on the olefin, with optimum results at about 2%, using a total pressure of 1500# and an olefin space velocity of about 0.09–0.1. Space velocity, pressure, and elapsed operating time subsequent to catalyst reactivation influence the proportion of water to total feed required for optimum results.

As space velocities increase, that is, as the rate of throughput of reaction mixture increases, the amount of water desirably used decreases. As the total pressure increases, the proportion of water in the feed, desirably used, decreases. As the reaction proceeds, the amount of water used may be decreased. The maximum water requirement appears to exist just after reactivation—or activation—of the catalyst. As the catalyst continues on stream, the water requirement, that is, the amount of water, for optimum results, decreases. These variations, of course, are all within the limits stated above. The larger water requirement at the start of an on-stream period, with either fresh catalyst or reactivated catalyst, may also be satisfied, in part at least, by supplying steam to the reaction zone at the end of activation or reactivation, and then carrying out the reaction with the use of quantities of water in the lower part of the useful range.

The water may be supplied in various ways. It may be introduced into the reaction zone in the form of steam in a stream separate from the other feed, but, generally speaking, this is somewhat inconvenient. It may be admixed with the other gases either after their final preheating or prior thereto or in the form of steam, but again this is somewhat inconvenient. The most convenient way of supplying the water is to admix it with the ammonia, in which it is completely soluble, and to carry it into the reaction vessel along with the ammonia, which is usually admixed with the olefin prior to the final preheating before introduction into the reaction zone. Control of the amount of water in the ammonia which is supplied to the system provides complete control of the amount of water which is supplied to the reaction zone because the hydrocarbon used normally contains at most a very inconsiderable amount of water, and because it is always necessary to avoid feeding hydrocarbon, without ammonia, to the reaction zone.

The invention will be further illustrated in connection with the appended drawing and the production of nitrogen-containing products by the direct reaction of propylene with ammonia using a cobalt catalyst of the type described in application Serial No. 444,097.

The drawing illustrates diagrammatically apparatus in which the process may be carried out, the apparatus being provided with two reactors 10 and 12, adapted to be operated alternately, that is, during the time that one reactor is on stream, the other is treated to reactivate or regenerate the catalyst, the on-stream periods and the regeneration or reactivation periods being calculated to be approximately the same so that in effect there is continuous operation of the apparatus as a whole. Each of the reaction vessels is an elongated vertical vessel packed with pelleted catalyst of the type described in said application Serial No. 444,095. The feed is introduced at the top and the reaction mixture withdrawn from the bottom and supplied to a stabilizer in which more volatile constituents of the reaction mixture, including ammonia and unreacted propylene and propane are separated from the reaction product, the ammonia being recovered for recycling and reuse in the process, the light hydrocarbons being used for other purposes, such as fuel.

To the top of the reactor is supplied a hot, compressed mixture of ammonia, propylene, in the illustration to be used admixed with propane, and a regulated quantity of water. The reaction is exothermic, and in the apparatus shown, is advantageously carried out adiabatically, temperature control being achieved through the use of a large excess of ammonia, which favors the reaction and prevents undue rise in temperature, and also to the presence of propane in the mixture, which also tends to prevent undue rise in temperature.

Ammonia and the propane-propylene mixture, in these examples a de-ethanized PP fraction from cracking, containing around 40% of propylene, 55% of propane, with the balance ethane, ethylene and higher hydrocarbons, are supplied from the sources 14 and 16 through the line 18 to the preheater 20, in which the temperature of the mixture is raised to about 600° F., under a pressure of about 1,500 pounds per square inch, by suitable pumps (not shown). The ammonia and the propylene-propane mixture are supplied in proportions such that there is about 10 mols of ammonia for each mol of propylene in the reaction mixture.

Regulated amounts of water are incorporated in the ammonia feed in the ammonia storage vessel so that there is carried into the reaction zone along with the feed, a regulated quantity of water. By including 0.2 mol per cent of water in the ammonia, the feed will contain, with the proportions stated above for this illustration of the carrying out of the invention, 2.0 mol per cent of water based on the propylene feed, the water in the hydrocarbon, being practically negligible in amount, being disregarded, and the partial pressure of the water vapor in the reactor will be about 2.4 #/sq. in. As pointed out above, the quantity of water used may be varied over a considerable range, i. e., from 0.2 mol per cent to 5.0 mol per cent or somewhat more based upon the propylene within the limits imposed by the requirement that water vapor partial pressures be between about 0.1 about 30 #/sq. in. Use of less water than this, that is, carrying out of the reaction under substantially anhydrous conditions, results in a decreased yield of nitrogen-containing products, and also results in a more rapid deactivation of the catalyst, so that catalyst efficiency drops off more rapidly than is the case where the regulated small amounts of the water of the invention are used. Use of excessive quantities of water also seems to impair the catalyst activity and to cut down the yield of nitrogen-containing product.

Results of typical runs. with operation as described above, at 640 to 650° F., 1500 pounds pressure and ammonia-propylene ratios of about 10, are shown in the following table, which gives the temperatures of operation, the pressure, the space velocity in volume of liquid feed per volume of catalyst per hour, the ammonia-propylene ratio (using a de-ethanized PP fraction containing about 40% propylene, 55% propane with the balance mainly lighter hydrocarbons), the total production of nitrogen-containing products in mol per cent based on the propylene feed, the percentage of tar, and the amount of water supplied in mol per cent based on the propylene feed:

|  | Run A | Run B |
|---|---|---|
| Temperature ................... ° F.. | 642 | 641 |
| Pressure ........................ #/sq. in.. | 1,500 | 1,500 |
| Hydrocarbon feed, moles/hr .......... | 26.30 | 25.36 |
| Ammonia feed, moles/hr .............. | 110.4 | 113.3 |
| Ammonia-olefin ratio ................. | 11.23 | 10.62 |
| Water-olefin molar ratio .............. | 0.0205 | 0.00938 |
| Water vapor partial pressure .... #/sq. in.. | 2.37 | 1.03 |
| Space velocity, olefin ................ | 0.0889 | 0.0980 |
| % Nitrogen containing products ...... | 20.73 | 19.95 |
| % Nitriles, as $C_1 \equiv N$ ................ | 17.71 | 16.72 |
| % Polymer ........................... | 3.02 | 3.23 |

I claim:

1. In the process of producing amines and nitriles by the reaction of olefins with ammonia in the vapor phase in the presence of a catalyst comprising reduced cobalt oxide effective to bring about the combination of ammonia with olefins, the ammonia being present in substantial excess and the reaction being carried out at elevated temperatures within the range 500°–800° F. and under elevated pressures within the range 500–5000 pounds per square inch, the step of including in the reaction mixture a regulated small quantity of water, the amount of water being a fraction of 1% of the reaction mixture.

2. The process as in claim 1 in which the quantity of water is such that the water vapor partial pressure in the reaction mixture is from about 0.1 to about 30 pounds per square inch.

3. In the production of amines and nitriles by the direct reaction of ammonia with propylene in the presence of a catalyst comprising reduced cobalt oxide, the ammonia being present in substantial excess and the reaction being carried out at elevated temperatures within the range 500°–800° F. and under elevated pressures within the range 500–5000 pounds per square inch, the step of including in the reaction mixture water in amount such that the water vapor partial pressure is from about 0.1 to about 30 pounds per square inch.

4. In the production of amines and nitriles by the direct reaction of ammonia with propylene in the presence of a catalyst comprising reduced cobalt oxide, the reaction being carried out at elevated temperatures within the range 500°–800° F. and under elevated pressures within the range 500–5000 pounds per square inch, the step of including in the reaction mixture water in amount such that the proportion of water is about 2.0 mol per cent. based on the olefin and such that the water vapor partial pressure is from about .8 to about 8 pounds per square inch, the ammonia being present in large excess based on the propylene.

JOHN W. TETER.

REFERENCES CITED

The following references are of record in the file of this patent:

UNITED STATES PATENTS

| Number | Name | Date |
|---|---|---|
| 1,920,795 | Jaeger | Aug. 1, 1933 |
| 1,492,194 | Beindl | Apr. 29, 1924 |
| 2,057,282 | Tramm et al. | Oct. 13, 1936 |
| 1,934,610 | Wheeler | Nov. 7, 1933 |
| 1,957,749 | Andrussow et al. | May 8, 1934 |
| 2,184,062 | Harris | Dec. 19, 1939 |